United States Patent
Inga

(10) Patent No.: US 10,022,692 B2
(45) Date of Patent: Jul. 17, 2018

(54) FISCHER-TROPSCH CATALYST ACTIVATION PROCEDURE

(71) Applicant: GI—GASIFICATION INTERNATIONAL, S.A.

(72) Inventor: Juan R. Inga, Katy, TX (US)

(73) Assignee: SGCE LLC, Pasadena, TX (US)

( * ) Notice: Subject to any disclaimer, the term of this patent is extended or adjusted under 35 U.S.C. 154(b) by 404 days.

(21) Appl. No.: 14/706,724

(22) Filed: May 7, 2015

(65) Prior Publication Data
US 2015/0238916 A1    Aug. 27, 2015

Related U.S. Application Data

(62) Division of application No. 13/117,879, filed on May 27, 2011, now Pat. No. 9,050,588.

(51) Int. Cl.
*B01J 8/00*    (2006.01)
*B01J 8/02*    (2006.01)
(Continued)

(52) U.S. Cl.
CPC .............. *B01J 8/0278* (2013.01); *B01J 8/001* (2013.01); *B01J 23/75* (2013.01); *B01J 37/16* (2013.01); *B01J 37/18* (2013.01); *C01B 3/50* (2013.01); *C01B 13/11* (2013.01); *C10G 2/332* (2013.01); *B01J 2208/00628* (2013.01); *B01J 2208/00893* (2013.01); *C01B 2201/14* (2013.01); *C01B 2203/0233* (2013.01); *C01B 2203/04* (2013.01);
(Continued)

(58) Field of Classification Search
CPC ...................... B01J 8/001; B01J 8/0278; B01J 2208/00628; B01J 2208/00893; B01J 38/00; C01B 3/50
See application file for complete search history.

(56) References Cited

U.S. PATENT DOCUMENTS 4,579,985 A     4/1986   Minderhoud
5,053,371 A  *  10/1991  Williamson ............... B01J 8/12
                                                      208/140
(Continued)

FOREIGN PATENT DOCUMENTS

RU         2187770       8/2002

OTHER PUBLICATIONS

Search Report and Written Opinion dated May 31, 2012 for corresponding International Application No. PCT/US2011/049959 (10 pgs.).

*Primary Examiner* — Jun Li
(74) *Attorney, Agent, or Firm* — Timothy S. Westby; Porter Hedges LLP

(57) ABSTRACT

A Fischer-Tropsch catalyst activation system including separation apparatus configured for separating a product gas comprising primarily hydrogen from a gas stream comprising hydrogen, an activation reactor fluidly connected with the separation apparatus via an activation gas inlet line whereby the product gas may be introduced into the activation reactor, and a circulation loop fluidly connecting a gas outlet of the activation reactor with the activation gas inlet line or with another gas inlet of the activation reactor and fluidly connecting the activation reactor with one or more apparatus configured for removal of $H_2O$. A method of activating a Fischer-Tropsch catalyst is also provided.

18 Claims, 1 Drawing Sheet

(51) Int. Cl.
  *B01J 37/16* (2006.01)
  *B01J 37/18* (2006.01)
  *B01J 23/75* (2006.01)
  *C10G 2/00* (2006.01)
  *C01B 3/50* (2006.01)
  *C01B 13/11* (2006.01)

(52) U.S. Cl.
  CPC   *C01B 2203/062* (2013.01); *C01B 2203/1241* (2013.01); *C10G 2300/703* (2013.01); *Y02P 20/582* (2015.11)

(56) References Cited

U.S. PATENT DOCUMENTS

| | | | |
|---|---|---|---|
| 6,114,400 A * | 9/2000 | Nataraj | C01B 3/36 252/373 |
| 6,239,184 B1 * | 5/2001 | Beer | C07C 1/066 518/702 |
| 6,642,281 B1 * | 11/2003 | Long | B01J 23/94 502/20 |
| 6,919,062 B1 | 7/2005 | Vasileiadis et al. | |
| 6,974,842 B1 * | 12/2005 | Spena | C10G 2/32 518/700 |
| 7,300,642 B1 | 11/2007 | Pedersen et al. | |
| 2003/0083391 A1 | 5/2003 | Jahnke et al. | |
| 2004/0116277 A1 | 6/2004 | Clarkson et al. | |
| 2004/0127585 A1 * | 7/2004 | Raje | B01J 23/75 518/715 |
| 2004/0204504 A1 | 10/2004 | Malek et al. | |
| 2004/0204505 A1 | 10/2004 | Malek et al. | |
| 2004/0204506 A1 | 10/2004 | Mauldin et al. | |
| 2005/0032920 A1 | 2/2005 | Norbeck et al. | |
| 2005/0227866 A1 | 10/2005 | Berge et al. | |
| 2005/0256212 A1 | 11/2005 | Norbeck et al. | |
| 2006/0074132 A1 | 4/2006 | Allam et al. | |
| 2006/0142400 A1 | 6/2006 | Bowe | |
| 2007/0112080 A1 | 5/2007 | Green et al. | |
| 2007/0142483 A1 | 6/2007 | White et al. | |
| 2007/0244207 A1 | 10/2007 | Mauldin et al. | |
| 2007/0287759 A1 | 12/2007 | Visagie et al. | |
| 2008/0132588 A1 | 6/2008 | Pedersen et al. | |
| 2008/0196478 A1 | 8/2008 | Raghurama et al. | |
| 2010/0160156 A1 | 6/2010 | Ibsen et al. | |
| 2010/0184873 A1 | 7/2010 | Bracht et al. | |
| 2010/0204348 A1 | 8/2010 | Pedersen et al. | |
| 2011/0313061 A1 | 12/2011 | White et al. | |

* cited by examiner

FISCHER-TROPSCH CATALYST ACTIVATION PROCEDURE

CROSS-REFERENCE TO RELATED APPLICATIONS

This application is a divisional application of U.S. patent application Ser. No. 13/117,879 filed on May 27, 2011, the disclosure of which is incorporated herein by reference in its entirety.

STATEMENT REGARDING FEDERALLY SPONSORED RESEARCH OR DEVELOPMENT

Not Applicable.

BACKGROUND

Field of the Invention

The present invention relates generally to catalysts. More particularly, the present invention relates to Fischer-Tropsch catalysts. Still more specifically, the present invention relates to a novel method and system for activating Fischer-Tropsch catalysts and production therewith of Fischer-Tropsch synthesis products.

Background of the Invention

The Fischer-Tropsch process was developed in the 1920's as a way of producing hydrocarbons from synthesis gas, i.e. a mixture of hydrogen and carbon monoxide, also known as 'syngas'. Initially, the process was centered on producing gasoline-range hydrocarbons as automotive fuels. More recently however, the Fischer Tropsch process is increasingly utilized as a method for preparing heavier hydrocarbons, such as diesel fuels, and waxy molecules that can subsequently be converted into clean, efficient lubricants.

Fischer-Tropsch synthesis involves the catalytic reductive oligomerization of carbon monoxide in the presence of hydrogen as follows:

$$nCO + 2nH_2 \leftrightarrow (CH_2)_n + nH_2O, \quad (1)$$

where n is an integer and $(CH_2)_n$ represents paraffinic and olefinic hydrocarbons. Generally, the Fischer-Tropsch process converts a mixture of carbon monoxide and molecular hydrogen into a mixture of hydrocarbons, including saturated hydrocarbons and olefins. Oxygenated hydrocarbons, such as alcohols, and some aromatics may also be formed in a Fischer-Tropsch process. More specifically, products of Fischer-Tropsch synthesis can include gaseous, liquid, heavy oil, and wax products, which are typically further upgraded to various fuels, including gasoline, jet, and diesel fuels, and other value-added hydrocarbon products, particularly liquid hydrocarbons.

Fischer Tropsch synthesis utilizes transition metal catalysts. The most common catalysts are based on cobalt and iron. Commercial plants such as those presently operating in South Africa are based on iron-based catalysts, while those currently under consideration in Qatar are based on cobalt-based catalysts. Fischer Tropsch catalyst is usually manufactured in an oxide form for safety as well as economic reasons, because the oxide forms of the catalysts are typically more stable than the activated or reduced form of the catalyst, which is generally pyrophoric. Once transported to a Fischer-Tropsch synthesis site, the catalyst is reduced either in situ in a Fischer-Tropsch synthesis reactor or in a dedicated activation vessel. If reduced outside the synthesis reactor, the catalyst typically is either encapsulated and sent to the reactor or transported to the reactor in the reduced form. Although unreduced catalyst may also be sent to a Fischer-Tropsch synthesis reactor to be reduced during the actual Fischer Tropsch synthesis, an optimal level of catalyst activity is generally not obtained via this method.

Published activation techniques involve reduction in a stream of gaseous hydrogen and/or carbon monoxide. The characteristics of reduction with carbon monoxide or hydrogen are well known to those skilled in the art. Many laboratory studies have been performed utilizing high purity gases in very controlled environments. Commercial plants do not usually operate with such high purity gases due to the potential for contamination and the associated high cost. This creates a challenge when reducing Fischer-Tropsch catalyst. A typical approach has been to utilize a pressure swing adsorption (PSA) system that produces very high purity hydrogen (e.g., 99.5 volume percent to 99.999 volume percent). The contaminants in the PSA product hydrogen are typically carbon monoxide and carbon dioxide, which are generally present at levels in the range of from about 0.1 ppmv to about 10 ppmv. Other contaminants such as hydrocarbon gases (primarily methane) are usually kept in the range of from about 0.1 ppmv to 10 ppmv. A more cost effective means of providing hydrogen is the use of hydrogen separation membranes. However, the maximum purity that can typically be achieved with a hydrogen membrane is around 95 volume percent. Such hydrogen separation membranes have conventionally not been considered due to the potential negative impact of the 5 volume percent non-hydrogen components on the catalyst activation, due to subsequent catalyst poisoning considerations.

Accordingly, there is a need in the art for a new method and system that enable Fischer-Tropsch catalyst activation utilizing activation gas streams comprising primarily hydrogen, and which are produced via relatively economical apparatus for hydrogen separation. Such hydrogen separation apparatus may produce hydrogen having a purity that is less than that generally obtained via pressure swing adsorption, e.g. less than about 99.5 volume percent. Desirably, such a system and method allow activation of Fischer-Tropsch catalysts utilizing hydrogen produced via a hydrogen separation membrane.

SUMMARY

Herein disclosed is a method of activating a Fischer-Tropsch catalyst, the method comprising: introducing an activation gas into an activation reactor of a circulation loop until a desired activation pressure is attained, wherein the activation gas comprises product gas separated from a gas stream and comprising hydrogen. and at least one component selected from the group consisting of carbon monoxide and water vapor, wherein the activation reactor contains the Fischer-Tropsch catalyst to be activated, and wherein the circulation loop is configured for recycle to the activation reactor of exit gas comprising hydrogen; circulating gas through the circulation loop and heating the activation reactor to a circulation temperature less than an activation temperature at which the Fischer-Tropsch catalyst is reduced, whereby at least a portion of any carbon monoxide is converted into an inert component with the production of water vapor, and wherein circulating gas through the circulation loop comprises removing at least a portion of any $H_2O$ introduced with the product gas, at least a portion of any $H_2O$ formed via conversion of carbon monoxide, at least a portion of any $H_2O$ formed via reduction of catalyst from a higher oxide to a lower oxide, or some combination thereof; maintaining circulation until the concentration of carbon monoxide in the circulation loop is below a desired CO concentration, the concentration of $H_2O$ in the circulation loop is below a desired $H_2O$ concentration, or both; and raising the temperature of the activation reactor to the activation temperature.

In embodiments, the activation gas further comprises at least one component selected from the group consisting of $CO_2$, $CH_4$ and $N_2$. In embodiments, the product gas comprises less than 99.5 volume percent hydrogen. In embodiments, the product gas comprises less than 99 volume percent hydrogen. In embodiments, the product gas comprises at least 1 volume percent of one or more non-inert gases other than hydrogen. In embodiments, the product gas comprises at least 1 volume percent carbon monoxide. In embodiments, the product gas is produced with one or more hydrogen separation membranes. In embodiments, following attainment of the activation pressure, no additional activation gas is introduced into the circulation loop. In embodiments, removing at least a portion of any $H_2O$ comprises reducing the temperature of the gas exiting the activation reactor and separating water therefrom. In embodiments, reducing the temperature of the gas exiting the activation reactor and separating water therefrom comprises introducing the exit gas into a cooler and introducing the cooled gas into a gas/liquid separator, whereby water is separated from a vapor fraction. The cooled gas may have a temperature of less than or about 4° C. The cooled gas may have a temperature of less than or about 0° C.

In embodiments, reducing the temperature of the gas exiting the activation reactor and separating water therefrom further comprises introducing the vapor fraction exiting the gas/liquid separator into a dryer. In embodiments, the method further comprises compressing the vapor fraction prior to introduction thereof into the dryer. In embodiments, the dryer comprises a molecular sieve. The molecular sieve may be operable to reduce the dew point to a value of less than or in the range of from about −20° F. to −30° F. The molecular sieve may be operable to reduce the water content to less than 100 ppmv at 1 atmosphere (a dew point of less than about −40° F.). The molecular sieve may be operable to reduce the water content to less than 1 ppmv at 1 atmosphere (a dew point of less than about −105° F.). In embodiments, removing at least a portion of the $H_2O$ comprises introducing the gas exiting the activation reactor into a dryer. The dryer can comprise a molecular sieve capable of dew points less than or in the range of from about −20° F. to −30° F. The molecular sieve may be operable to reduce the water content to less than 100 ppmv at 1 atmosphere (a dew point of less than about −40° F.). The molecular sieve may be operable to reduce the water content to less than 1 ppmv at 1 atmosphere (a dew point of less than about −105° F.). In embodiments, the dryer comprises a liquid absorber.

In embodiments, the gas stream comprises synthesis gas suitable for Fischer-Tropsch reactions. In embodiments, the Fischer-Tropsch catalyst is iron-based. In embodiments, the Fischer-Tropsch catalyst is cobalt-based. In embodiments, the circulation temperature is less than or equal to about 300° C. (572° F.). In embodiments, the activation temperature is in the range of from about 300° C. to about 600° C. In embodiments, the activation temperature is in the range of from about 300° C. to about 500° C. In embodiments, the activation temperature is in the range of from about 300° C. to about 450° C. In embodiments, the desired CO concentration is less than about 1 ppmv. In embodiments, the desired CO concentration is less than about 0.1 ppmv. In embodiments, the desired $H_2O$ concentration is less than about 100 ppmv.

In embodiments, prior to raising the temperature of the activation reactor to the activation temperature, the pressure falls less than about 10 psig from the desired activation pressure. In embodiments, prior to raising the temperature of the activation reactor to the activation temperature, the hydrogen purity of the activation gas in the circulation loop is no more than about 9 volume percent less than the hydrogen purity of the product gas.

In embodiments, the method further comprises purging a portion of the gas from the circulation loop. In embodiments, the activation reactor is a Fischer-Tropsch synthesis reactor; or the activation reactor is a dedicated activation reactor.

Also disclosed herein are a catalyst produced via the disclosed method and Fischer-Tropsch hydrocarbons produced by contacting such a catalyst with synthesis gas under suitable operating conditions.

Also disclosed herein is a system for activating a Fischer-Tropsch catalyst, the system comprising: separation apparatus configured for separating a product gas comprising primarily hydrogen from a gas stream comprising hydrogen; an activation reactor fluidly connected with the separation apparatus via an activation gas inlet line whereby the product gas may be introduced into the activation reactor; a circulation loop fluidly connecting a gas outlet of the activation reactor with the activation gas inlet line or with another gas inlet of the activation reactor and fluidly connecting the activation reactor with one or more apparatus configured for removal of $H_2O$. In embodiments, the product gas comprises less than about 99.5 volume percent hydrogen. In embodiments, the separation apparatus is configured to provide a product gas comprising less than about 99 volume percent hydrogen. In embodiments, the activation reactor is a Fischer-Tropsch synthesis reactor or a dedicated activation reactor. In embodiments, the one or more apparatus comprises a cooler and a gas/liquid separator, wherein the cooler is configured to cool a gas introduced therein via the circulation loop such that water condenses and wherein the gas/liquid separator is configured for removal of condensed water from a vapor fraction comprising hydrogen. In embodiments, the cooler is configured to cool a gas introduced therein via the circulation loop to a temperature of less than about 4° C.

In embodiments, the system further comprises at least one dryer located downstream of the gas/liquid separator along the circulation loop. In embodiments, the system further comprises a blower or compressor between the gas/liquid separator and the at least one dryer and configured to compress the vapor fraction comprising hydrogen prior to introduction thereof into the at least one dryer. In embodiments, the dryer is selected from the group consisting of liquid absorbers and molecular sieves. In embodiments, the system comprises at least one molecular sieve capable of drying to dew points of less than or in the range of from about −20° F. to −30° F. In embodiments, the molecular sieve is operable to reduce the water content to less than 100 ppmv at 1 atmosphere (a dew point of less than about −40° F.).

In embodiments of the system, the one or more apparatus comprises a dryer. The system may further comprises a blower or compressor positioned upstream of the dryer along the circulation loop and configured to compress materials introduced thereto via the circulation loop. In embodiments, the dryer is selected from the group consisting of liquid absorbers and molecular sieves. In embodiments, the system comprises at least one molecular sieve capable of drying to dew points of less than or in the range of from about −20° F. to −30° F. In embodiments, the molecular sieve is operable to reduce the water content to less than 100 ppmv at 1 atmosphere (a dew point of less than about −40° F.). In embodiments, the molecular sieve is operable to reduce the water content to less than 1 ppmv at 1 atmosphere (a dew point of less than about −105° F.).

In embodiments, the system further comprises a purge line configured for removal of gas from the circulation loop.

The present invention comprises a new combination of features and advantages which enable it to overcome various problems of prior devices. The various characteristics described above, as well as other features, will be readily apparent to those skilled in the art upon reading the following detailed description of the various embodiments of the invention, and by referring to the accompanying drawings.

BRIEF DESCRIPTION OF THE DRAWINGS

For a more detailed description of the present invention, reference will now be made to the accompanying drawings, wherein.

NOTATION AND NOMENCLATURE

Figure 1:
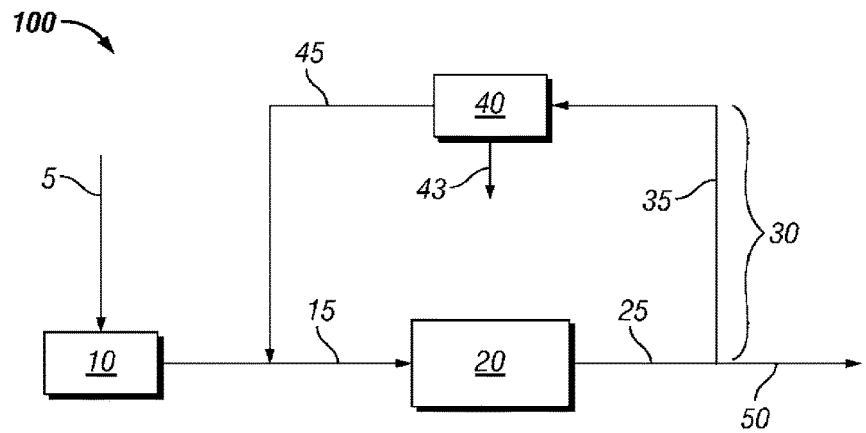
FIG. 1 is a schematic of a Fischer-Tropsch catalyst activation system according to an embodiment of this disclosure.

The terms 'activation' and 'reduction,' 'activate' and 'reduce' and 'activating' and 'reducing' are used interchangeably herein unless otherwise indicated.

DETAILED DESCRIPTION

I. Overview

Herein disclosed are a novel system and a novel method for Fischer Tropsch catalyst activation. Fischer-Tropsch synthesis catalysts must be reduced prior to or during use in the synthesis reaction to activate the catalyst, i.e. render the catalyst into its usefully active form. This reduction or activation comprises exposure of the unactivated Fischer-Tropsch catalyst to a reducing gas. The disclosed system and method allow the use of an activation gas comprising reduced purity hydrogen (e.g., in embodiments, about 95 volume percent hydrogen), rather than conventional activation gas comprising higher purity hydrogen (e.g., typically higher than about 99.9 volume percent hydrogen). In embodiments, the system and method enable the balance of the activation gas to comprise additional components that are generally not considered inert with regard to the activation process, e.g., water and/or carbon monoxide which are undesirable due to the tendency of both to inhibit the activation of catalyst in the presence thereof.

Because the presence of carbon monoxide and water in the reducing/activation gas tend to inhibit activation of catalyst, the disclosed system and method provide for the conversion of at least a majority of any carbon monoxide present in the activating gas to one or more component(s) considered inert with respect to the activation (e.g., conversion of the carbon monoxide to methane) and for the removal of water. Desirably, the conversion of non-hydrogen inert component(s) to inert component(s) is effected at temperature(s) at, near or below the activation temperature at which the Fischer-Tropsch catalyst is reduced. For example, in embodiments in which the system and method are utilized for the activation of cobalt-based Fischer-Tropsch catalysts, the conversion temperature(s) may correspond to the bulk reduction of $Co_3O_4$ to CoO.

In embodiments, water is introduced with the activation gas, and/or hydrogen in the activation gas reacts with oxygen released during heating to produce water. The disclosed system and method thus also provide for the removal of at least a portion of the water produced by, and/or introduced into, the activation process/system. As further discussed hereinbelow, in embodiments, the herein disclosed catalyst activation system is pressurized and no additional makeup hydrogen is introduced subsequent to the initial pressurization of the system. By eliminating the hydrogen makeup, the system pressure will typically drop over the course of the catalyst reduction as hydrogen is consumed and water is produced and removed. A potential benefit of utilizing no additional or make-up activation gas subsequent to the initial pressurization of the system is that no additional non-hydrogen inert components (e.g., carbon monoxide) will thereby be introduced into the system.

Via the disclosed system and method, impurities in an activation gas comprising primarily hydrogen are converted to components considered inert with regard to the activation (e.g., carbon monoxide may be converted to methane) and/or are removed from the system (e.g., removal of $H_2O$ introduced with the activation gas and/or produced during the heating up of the activation gas during and/or subsequent to initial pressurization of the system). For example, in embodiments, the activation gas comprises some non-insignificant amount (e.g., about 5 volume percent) of carbon monoxide, water or both and the carbon monoxide is converted to methane (which is considered inert for the Fischer Tropsch catalyst activation process; e.g., less than or about 5 volume percent methane) with the concomitant production of water, and water introduced with the activation gas and/or produced during conversion of the carbon monoxide is removed from the circulated activation gas.

II. System for Fischer-Tropsch Catalyst Activation

Herein disclosed is a novel system for activating a Fischer-Tropsch catalyst. Description of the system will now be made with reference to FIG. 1, which is a schematic of a system 100 for activating a Fischer-Tropsch catalyst according to an embodiment of this disclosure. The system comprises separation apparatus 10 configured for separating a product gas comprising primarily hydrogen from a gas stream comprising hydrogen, an activation reactor 20 fluidly connected with separation apparatus 10 via an activation gas inlet line 15 whereby the product gas may be introduced into activation reactor 20; a circulation loop 30 fluidly connecting a gas outlet line 25 of activation reactor 20 with activation gas inlet line 15, or with another gas inlet of the activation reactor (not shown in the embodiment of FIG. 1), and fluidly connecting activation reactor 20 with one or more apparatus 40 configured for removal of $H_2O$. In embodiments, the system further comprises a purge line 50, as indicated in the embodiment of FIG. 1. Each of the components of the system will be described in more detail hereinbelow.

Separation Apparatus 10.

System 100 comprises separation apparatus 10 configured for separating a product gas comprising primarily hydrogen from a gas stream comprising hydrogen. In embodiments, the separation apparatus comprises one or more hydrogen separation membranes. Any suitable hydrogen separation membrane known in the art may be incorporated into hydrogen separation apparatus 10. Commercial gas separation membranes are based on modified cellulose, usually treated polysulfone or a type of polycarbon polymer. In embodiments, hydrogen separation apparatus 10 comprises a hydrogen separation membrane comprising modified cellulose. In embodiments, hydrogen separation apparatus 10 comprises a hydrogen separation membrane comprising polysulfone. In embodiments, hydrogen separation apparatus 10 comprises a hydrogen separation membrane comprising polycarbon polymer. In embodiments, hydrogen separation apparatus 10 does not comprise a pressure swing adsorption (PSA) unit.

In embodiments, hydrogen separation apparatus 10 is operable to produce product gas having a hydrogen purity of less than or about 95 volume percent. In embodiments, hydrogen separation apparatus 10 is operable to produce product gas comprising less than 99.5 volume percent hydrogen. In embodiments, hydrogen separation apparatus 10 is operable to produce a product gas comprising less than 99 volume percent hydrogen. In embodiments, hydrogen separation apparatus 10 is operable to produce product gas comprising at least 1 volume percent of one or more gases other than hydrogen that are considered non-inert with respect to Fischer-Tropsch catalyst activation. Such non-inert gas can include CO, $H_2O$ and combinations thereof. In embodiments, hydrogen separation apparatus 10 is operable to produce product gas comprising at least 1 volume percent carbon monoxide. In embodiments, hydrogen separation apparatus 10 is operable to produce product gas comprising primarily hydrogen, wherein the non-hydrogen components are selected from the group consisting of $H_2O$, $CO_2$, CO, $CH_4$ and $N_2$. In embodiments, the product gas comprises up to, less than, or more than about 5 volume percent non-hydrogen components (also referred to herein as 'contaminants'). In embodiments, the relative amount of contaminants follows one or more of the following relationships: amount of $H_2O$ greater than or equal to amount of $CO_2$; amount of $CO_2$ greater than or equal to amount of CO; amount of CO greater than or equal to amount of $CH_4$; amount of $CH_4$ greater than or equal to amount of $N_2$. In embodiments, hydrogen separation apparatus 10 comprises one or more hydrogen membranes, the feed gas stream to separation apparatus 10 comprises synthesis gas, and the contaminants comprise, due to the relative permeation rates of the components therethrough, predominantly $H_2O$ followed by $CO_2$ then CO, $CH_4$ and $N_2$.

A feed gas inlet line(s) 5 is utilized to introduce feed gas comprising hydrogen into hydrogen separation apparatus 10. Hydrogen separation apparatus 10 may be operable to produce a product gas comprising primarily hydrogen from a feed gas comprising hydrogen and selected from the group consisting of synthesis gas, unreacted Fischer Tropsch tail gas, pre-reformer gas, reformer gas, shifted gas, ammonia plant purge gas, demethanizer/ethylene off gases, POX gases, refinery purge streams and combinations thereof. In embodiments, hydrogen separation apparatus 10 produces product gas comprising primarily hydrogen from a synthesis gas feed gas. Synthesis gas (i.e. a mixture of CO and hydrogen; also referred to herein as, 'syngas') can be generated in a number of ways, from a variety of source materials. The synthesis gas fed into separation apparatus 10 can be a product of the gasification of coal, biomass, waste, or a combination thereof. In embodiments, the synthesis gas fed into separation apparatus 10 is a product of steam reforming or partial oxidation of methane (e.g., natural gas). The ratio of $H_2$ to CO in synthesis gas from a given source may vary significantly (e.g., from about 0.3 up to 3 or higher) and a given Fischer-Tropsch catalyst may be sensitive to that ratio (i.e. exhibit increased or decreased activity or changes in selectivity dependent upon that ratio.) The synthesis gas from which the product gas is produced within hydrogen separation apparatus 10 may have a molar ratio of hydrogen to carbon monoxide (i.e. a $H_2$:CO molar ratio) in the range of from about 1.0 to about 100, from about 1.6 to about 3.5, from about 1.3 to about 1.6. Hydrogen separation apparatus 10 may be configured for the production of product gas comprising primarily hydrogen from Fischer-Tropsch tailgas, i.e. in embodiments, the synthesis gas introduced into hydrogen separation apparatus 10 has previously passed through a Fischer-Tropsch production reactor.

Although the disclosed system is described as comprising hydrogen separation apparatus 10, it is also envisioned that, in some applications, the product gas is obtained via a hydrogen separation apparatus that is remote from the site at which the balance of the system is located. That is, in embodiments, the product gas may be shipped in for use and not actually be produced local to the activation reactor. In such embodiments, the system may not comprise hydrogen separation apparatus 10.

Activation Reactor 20.

As illustrated in the embodiment of FIG. 1, the herein disclosed Fischer-Tropsch catalyst activation system further comprises an activation reactor 20. Activation reactor 20 is fluidly connected with separation apparatus 10 via an activation gas inlet line 15, whereby the product gas produced in separation apparatus 10 can be introduced into activation reactor 20. Catalytic metals used in the Fischer-Tropsch synthesis are usually active for hydrocarbon synthesis in the zero-valent metallic state. As mentioned hereinabove, reduced catalytic metals are highly susceptible to oxidation by any number of oxidizing agents, and in particular by molecular oxygen in air. Oxidation of the reduced (activated) catalytic metals to an oxidized state decreases the catalyst activity. It is thus beneficial to protect reduced catalyst from oxidation prior to use in Fischer-Tropsch synthesis. Because of the sensitivity of activated catalysts to oxidation, in situ reduction/activation of catalysts may be preferable, and activation reactor 20 may comprise a Fischer-Tropsch synthesis reactor. However, methods are known in the art for catalyst reduction/activation external to a Fischer-Tropsch synthesis reactor. For example, reduced catalyst can be embedded in a coating material, such as wax or oil, to provide a barrier to oxidation. Thus, in embodiments, activation reactor 20 is a dedicated activation reactor in which Fischer-Tropsch catalyst is activated and from which activated Fischer-Tropsch catalyst is subsequently transferred to a Fischer-Tropsch production reactor, as discussed further hereinbelow. Such dedicated activation reactors are well known in the art. In such embodiments, system 100 may further comprise apparatus for transferring activated Fischer-Tropsch catalyst to one or more Fischer-Tropsch production reactor. Such apparatus for transferring activated Fischer-Tropsch catalyst from a dedicated activation reactor to a Fischer-Tropsch production reactor will desirably be operable to transfer the activated catalyst while minimizing and/or preventing (re-)oxidation of the activated (i.e. reduced) catalyst. For example, in such embodiments, the dedicated activation reactor may be operable to coat activated catalyst with liquid (e.g., Fischer-Tropsch wax or liquid) prior to transfer of activated, coated Fischer-Tropsch catalyst from the dedicated activation reactor to one or more Fischer-Tropsch production reactor. Alternatively or additionally, in such embodiments, the system may be configured for transfer of activated catalyst from the dedicated activation reactor to one or more Fischer-Tropsch production reactors under inert gas (e.g., under helium, nitrogen, etc.)

In embodiments, activation reactor 20 is a Fischer-Tropsch production reactor in which catalyst is activated prior to substantial production of Fischer-Tropsch products therein. Such Fischer-Tropsch production reactors are well known in the art. In embodiments, activation reactor 20 is selected from the group consisting of Fischer-Tropsch production reactors. In embodiments, the Fischer-Tropsch production reactor(s) is selected from the group consisting of slurry phase or continuously stirred tank reactors (CSTR), fluidized bed reactors, slurry bubble column reactors, and fixed bed reactors. Such fixed bed reactors may be selected from the group consisting of tubular reactors and microchannel reactors. Generally, the reactor type selected depends on the catalyst employed, the operable reaction conditions, and the desired product profile. For example, because the first three reactor types involve substantial motion of catalyst particles, Fischer-Tropsch catalysts that are mechanically robust may be most suitable for use with CSTR's, fluidized beds, and slurry bubble column reactors. Such reactors can also be utilized with less robust catalyst if such catalyst is acceptably inexpensive (e.g., Fe-containing catalysts) and as long as downstream separation of catalyst fines from the Fischer-Tropsch product is (e.g., economically) feasible. Fixed bed reactors may be more suitable for such less robust catalyst.

The choice of reactor type also depends on the efficiency of heat removal. This influences not only the Fischer-Tropsch synthesis reaction but activation of the catalyst. For example, copper and iron-based catalysts are subject to deactivation by sintering if the heat produced via the exothermic reduction is not adequately removed. Fixed bed reactors are least efficient in heat removal and the other types of reactors are more suited to this purpose. Due to the highly exothermic nature of the Fischer-Tropsch synthesis, Fischer-Tropsch reactors are designed with provisions for temperature control to prevent reaction runaway.

In embodiments, activation reactor 20 is a fixed bed reactor in which Fischer-Tropsch synthesis is carried out following activation according to this disclosure by passing a reactant gas mixture comprising synthesis gas over a bed of solid catalyst. For example, a fixed bed reactor may comprise a plurality of tubes or catalyst containers within a reactor shell. In fixed bed reactors, excess heat can be carried away by forming steam from water, which may be added, for example, to a reactor shell surrounding a plurality of tubes.

In embodiments, activation reactor 20 is a fluidized bed reactor. Fluidized bed reactors for low temperature Fischer-Tropsch reaction are also known as slurry bubble column reactors (SBCR's), slurry bed, slurry phase, or multiphase reactors. Such SBCR's comprise a reactor shell containing a slurry comprising catalyst particles and a liquid (e.g., generally hydrocarbon) phase. During Fischer-Tropsch synthesis in a SBCR, the reactor shell and the slurry are typically cooled via cooling coils and the feed gas stream is introduced into the slurry. Such SBCR's typically comprise a feed stream distribution system configured for introducing the feed stream at the bottom of the slurry, for example, as small gas bubbles that rise up through the slurry. The gases of the feed stream diffuse through the liquid phase in the slurry, thus encountering catalyst particles and reacting to produce Fischer-Tropsch products. Heavier hydrocarbons that may be produced are liquid under typical reactor operating temperatures and pressures and are incorporated into the slurry, while water vapor and lighter products (that remain gaseous at reaction temperature and pressure) leave the slurry and are collected as a gaseous product stream. If economically desirable, unconverted reactants may be recycled.

Another consideration when selecting a Fischer-Tropsch synthesis reactor for use as activation reactor 20 is that fixed bed reactors may overheat, thus reducing catalyst lifetime by deactivation and/or coke formation, while fluidized bed reactors can generally better tolerate higher average operating temperatures without such problems. Additionally, operation of fixed bed reactors must typically be halted to replace or regenerate catalyst, while catalyst additions and/or catalyst regenerations can generally be performed with continuous operation of fluidized bed reactors.

Catalyst.

The disclosed system and method are utilized to activate Fischer-Tropsch catalyst. While a number of metals demonstrate Fischer-Tropsch activity, only four metals: iron, cobalt, ruthenium, and nickel are regarded in the art as usefully active, although copper-based and manganese-based Fischer-Tropsch catalysts have shown limited utility. The catalysts most frequently employed in the Fischer-Tropsch synthesis are iron-based and cobalt-based catalysts. Ruthenium has the requisite catalytic activity for use in the Fischer-Tropsch synthesis but is generally expensive due to limited supply. The Fischer-Tropsch catalyst can further comprise one or more promoters, such as rhenium, zirconium, manganese, and the like, that are known in the art to improve various aspects of catalyst performance.

The utility of Fischer-Tropsch catalysts is decreased if they exhibit high methanation activity. High levels of catalytic methane formation from carbon monoxide and hydrogen decreases the utility of a Fischer-Tropsch catalyst for formation of higher hydrocarbons. For example, the utility of nickel on conventional metal oxide supports as a Fischer-Tropsch catalyst is decreased by its high methanation activity. In contrast, nickel supported on some molecular sieves, such as zeolite Y, does not exhibit high methanation activity, thus making such catalysts more useful Fischer-Tropsch catalysts.

Systems and methods utilizing iron-based and cobalt-based catalysts have received substantial attention. Such catalysts have their origins with Fischer and Tropsch, who developed alkalized iron turning and Kieselguhr supported cobalt/magnesia (or thoria) catalysts (See: F. Fischer and H. Tropsch (1923) Brennst. Chem. 4:276 and F. Fischer and H. Tropsch (1925) German Patent 484,337). While such catalysts are well known to those of skill in the art, it is noted here that iron-based and cobalt-based catalysts each have advantages for use in different circumstances. Iron-based catalysts are typically employed, for example, with synthesis gas comprising relatively low molar $H_2$:CO ratios (e.g., 0.5 to 1.5). Such low molar $H_2$:CO ratio synthesis gas may be produced, for example, via gasification of coal or biomass. Cobalt-based catalysts may be more appropriate for use with synthesis gas that comprises relatively higher molar ratios of $H_2$:CO (e.g., greater than about 1.5). Such relatively high molar $H_2$:CO ratio synthesis gas may be found, for example, in natural gas-to-hydrocarbon liquid applications.

Advantages of iron-based catalyst generally include lower cost, relative insensitivity to reaction conditions, such as molar ratio of $H_2$:CO and the presence of low levels of sulfide impurities, and the ability to function at relatively low molar ratios of $H_2$:CO. Cobalt-based catalysts are typically more expensive that iron-based catalysts and can show enhanced sensitivity to the molar ratio of $H_2$:CO in the feedgas to the Fischer-Tropsch synthesis. However, cobalt-based catalysts, in general, exhibit higher overall activity and increased mechanical strength compared to iron-based catalysts. Additionally, under similar conditions, iron-based catalysts tend to produce a distribution of hydrocarbons that is more heavily weighted toward high carbon number species (i.e. give a higher chain growth probability or Schulz Flory distribution factor, $\alpha$, as known in the art) than the hydrocarbon distribution produced using cobalt-based catalysts. Also, iron-based Fischer-Tropsch catalysts can also produce undesirably large amounts of carbon dioxide during the Fischer-Tropsch synthesis.

The herein disclosed system can be utilized to activate and/or the activation reactor can contain any Fischer-Tropsch catalyst known in the art that requires reduction/activation for optimal Fischer-Tropsch synthesis. The Fischer-Tropsch catalyst can be formed via any of the known methods, including without limitation, precipitation, incipient wetness impregnation of a support, etc. In embodiments, the herein disclosed system is utilized to activate and/or the activation reactor contains therein a Fischer-Tropsch catalyst selected from the group consisting of iron-based Fischer-Tropsch catalysts, cobalt-based Fischer-Tropsch catalysts, ruthenium-based Fischer-Tropsch catalysts, nickel-based Fischer-Tropsch catalysts, copper-based Fischer-Tropsch catalysts, and manganese-based Fischer-Tropsch catalysts. In embodiments, the system is utilized to activate and/or the activation reactor contains therein a Fischer-Tropsch catalyst selected from the group consisting of iron-based Fischer-Tropsch catalysts, cobalt-based Fischer-Tropsch catalysts, ruthenium-based Fischer-Tropsch catalysts, and nickel-based Fischer-Tropsch catalysts. In embodiments, the system is utilized to activate and/or the activation reactor contains therein a Fischer-Tropsch catalyst selected from the group consisting of iron-based Fischer-Tropsch catalysts and cobalt-based Fischer-Tropsch catalysts. In embodiments, the system is utilized to activate and/or the activation reactor contains therein a Fischer-Tropsch catalyst selected from iron-based Fischer-Tropsch catalysts. In embodiments, the system is utilized to activate and/or the activation reactor contains therein a Fischer-Tropsch catalyst selected from cobalt-based Fischer-Tropsch catalysts.

In embodiments, the catalyst is a particulate cobalt nitrate-based supported Fischer-Tropsch synthesis catalyst as disclosed in U.S. patent application Ser. No. 11/597,848 to Visagie et al., which is hereby incorporated herein by reference in its entirety for all purposes not contrary to this disclosure.

Circulation Loop 30.

The herein disclosed catalyst activation system further comprises a circulation or 'activation' loop fluidly connecting a gas outlet of the activation reactor with the activation gas inlet line or with another gas inlet of the activation reactor, and fluidly connecting the activation reactor with one or more apparatus configured for removal of $H_2O$. For example, in the embodiment of FIG. 1, circulation loop 30 comprises lines 35 and 45 which fluidly connect gas outlet line 25 with activation gas inlet line 15, and fluidly connect activation reactor 20 with one or more apparatus 40 for removal of $H_2O$. In the embodiment of FIG. 1, water removal line 43 indicates the removal of $H_2O$ from the circulation loop via the one or more apparatus 40 configured for the removal of water. Utilization of such a circulation loop 30 enables recycle of hydrogen during activation (step (d) of the method described further hereinbelow), thus ensuring that the hydrogen usage is not excessive.

One or More Water Removal Apparatus 40.

As mentioned hereinabove, circulation loop 30 comprises one or more water removal apparatus 40 configured for the removal of $H_2O$ from the system. The water removal apparatus can be operable to remove water vapor, water droplets, liquid water, or a combination thereof from the system (i.e. use of the term, 'water' is not meant to require removal of liquid water via the one or more water removal apparatus 40 of the circulation loop). In embodiments, the one or more water removal apparatus 40 is configured for the removal of liquid water. In embodiments, the one or more water removal apparatus 40 is configured for the removal of water vapor. In embodiments, the one or more water removal apparatus 40 is configured for the removal of both water vapor and liquid water.

Figure 2:
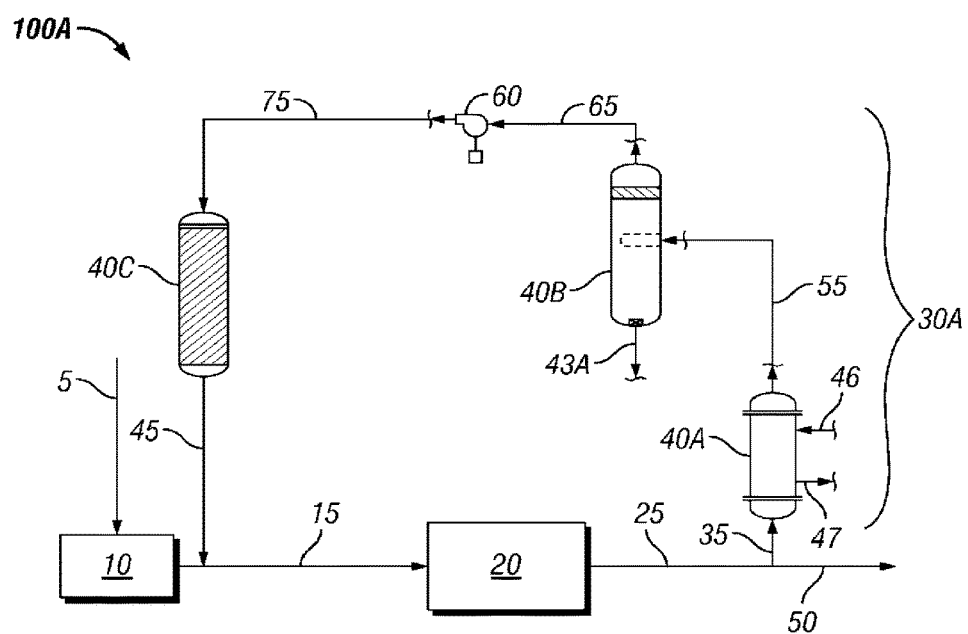
FIG. 2 is a schematic of a Fischer-Tropsch catalyst activation system according to another embodiment of this disclosure.

In embodiments, the one or more water removal apparatus 40 is operable to remove $H_2O$ via cooling/condensation and phase separation. In embodiments, the one or more water removal apparatus 40 is configured for the removal of $H_2O$ via physical separation (e.g., via absorption) as opposed to chemical separation, (e.g., as opposed adsorption). In embodiments, the one or more water removal apparatus 40 comprises a cooler and a gas/liquid separator, wherein the cooler is configured to cool a gas introduced therein via the circulation loop such that water condenses and wherein the gas/liquid separator is configured for removal of condensed water from a gaseous or vapor fraction comprising hydrogen. For example, in the embodiment of FIG. 2, which is a schematic of a Fischer-Tropsch catalyst activation system 100A according to another embodiment of this disclosure, circulation loop 30A comprises cooler (or 'heat exchanger') 40A and gas/liquid separator 40B. Cooler 40A is configured to reduce the temperature of the gas diverted from activation reactor gas outlet line 25 and introduced into cooler 40A via line 35. In embodiments, the cooler is configured to cool a gas introduced therein via the circulation loop to a temperature of less than or about 4° C., less than or about 2° C., or less than or about 0° C. Cooler 40A may operate to cool the gas introduced thereto via any means known in the art. For example, by way of non-limiting example, cooler 40A may be cooled via introduction of coolant (e.g., chilled liquid, such as, but not limited to, chilled water) via coolant inlet line 46 and extraction of heated coolant from cooler 40A via coolant outlet line 47. A line 55 of circulation loop 30 A is configured to introduce chilled product (gas with entrained water vapor/droplets) from cooler or heat exchanger 40A into gas/liquid separator 40B. Gas/liquid separator 40B is configured for removal of condensed water from a gaseous fraction comprising hydrogen or hydrogen and water vapor. Gas/liquid separator 40B may comprise any suitable gas/liquid separator known in the art to be suitable for the separation of water from a chilled gas stream. For example, in embodiments, gas/liquid separator 40B comprises a knockout (KO) drum or pot. In the embodiment of FIG. 2, water is removed from knockout pot gas/liquid separator 40B via condensed water outlet 43A.

In embodiments, the one or more $H_2O$ removal apparatus comprises one or more dryers selected from absorbers, such as, but not limited to, liquid absorbers and molecular sieves. In embodiments, the one or more dryers are utilized in conjunction with (e.g., along the circulation loop but downstream of) a cooler/gas/liquid separator combination as described hereinabove. In other embodiments, such a dryer is not utilized in combination with such a cooler/gas/liquid separator combination. Thus, in embodiments, the disclosed system comprises a single water removal apparatus (e.g., a liquid absorber, a molecular sieve or a cooler/gas/liquid separator combination), while, in other embodiments, the disclosed system comprises a plurality of water removal apparatus (e.g., a cooler/gas/liquid separator combination in combination with a liquid absorber and/or a molecular sieve, two or more molecular sieves, a molecular sieve and a liquid absorber, or any combination of two or more water removal apparatus selected from the group consisting of molecular sieves, liquid absorbers, and cooler/gas/liquid separator combinations). In embodiments comprising a plurality of water removal apparatus, a water removal apparatus which does not adequately reduce the dew point (and which may be less expensive) is positioned upstream of a water removal apparatus which polishes the dew point of the material introduced thereto to an acceptable level for catalyst activation (and may be more expensive than the first water removal apparatus).

In the embodiment of FIG. 2, dryer 40C is positioned along circulation loop 30A. In this embodiment, gas exiting gas/liquid separator 40B, that still has an undesirably high water content (e.g., contains insignificant amounts of water vapor), is introduced via a line 75 of circulation loop 30A into dryer 40C.

In embodiments, the system (i.e. the circulation loop) may further comprise a blower or compressor between the first water removal apparatus (e.g., the gas/liquid separator or knockout drum of a cooler/gas/liquid separator combination) and the at least one dryer. Such a compressor or blower may be configured to compress the product (gas and/or vapor fraction comprising hydrogen and $H_2O$) exiting the first water removal apparatus prior to introduction thereof into the at least one dryer. For example, in the embodiment of FIG. 2, line 65 is configured to introduce gas/vapor fraction separated in gas/liquid separator 40B into compressor or blower 60, and a line 75 is configured to introduce compressed material into the one or more dryers 40C. Of course, a compressor/blower may be utilized in embodiments of the system comprising a single water removal apparatus, although the need therefor will generally be reduced. In embodiments, a compressor/blower 60 is configured to pressurize the material to a pressure in the range of from about 1 to about 7 bars and/or by increasing the pressure by a ratio between the delivery pressure and the inlet pressure in the range of from about 1.2 to about 2.5.

In embodiments, the one or more dryers 40C comprise at least one molecular sieve. The molecular sieve may be any suitable molecular sieve known in the art. For example, the molecular sieve may contain zeolite capable of absorbing and desorbing significant quantities of water. The zeolite may be natural or artificial. Desirably, the dryer operates by physical absorption (not chemical adsorption), such that complete or substantially complete regeneration is practical. Desirably, the materials of construction of the molecular sieve allow for vigorous thermal regeneration without the need to dump and refill dryer chambers. In embodiments, the molecular sieve is operable at high pressures, for example, up to at least about 2.7 bar, up to at least about 15 bar, or up to at least about 27.5 bar. In embodiments, the molecular sieve is also operable to remove one or more additional potential contaminants of the activation gas in addition to water, such contaminants, in embodiments, selected from the group consisting of $CO_2$, $H_2S$, $SO_2$, $NH_3$, HCl, other polar contaminant molecules, and smaller organics. Thus, in embodiments, one or more additional contaminant, such as, but not limited to, $NH_3$, may also be absorbed (adsorbed) by the water absorbent (adsorbent). It will thus be appreciated that water and some of at least one additional contaminant present in the activation reactor offgas comprising unreacted hydrogen may be simultaneously removed from the circulating gas in a common process step, apparatus or unit operation (e.g., via a molecular sieve).

In embodiments, the herein disclosed system comprises a plurality of molecular sieves, such that at least one of the plurality of molecular sieves is online while at least another of the molecular sieves is offline. In this manner, at least one of the molecular sieves can be online while another spent molecular sieve is being regenerated. The molecular sieve(s) may be regenerated by any means known in the art, such as, by way of non-limiting example, thermal regeneration. Thermal regeneration may comprise heating the sieve material (e.g., up to about 450° C., 500° C., or 550° C.).

In embodiments, at least one of the one or more dryers 40C is capable of drying materials introduced therein to dew points of less than or in the range of from about −20° F. to −30° F. In embodiments, the molecular sieve is operable to reduce the water content to less than 100 ppmv at 1 atmosphere (a dew point of less than about −20° C.). In embodiments, the at least one molecular sieve is operable to reduce the water content to less than 1 ppmv at 1 atmosphere (a dew point of less than about −105° F.).

Purge Line 50.

In embodiments, the disclosed system further comprises one or more purge lines 50 configured for removal of gas from the circulation loop. Such a purge line may be utilized during catalyst activation to pressurize and depressurize and/or to purge between stages of regeneration. As discussed further hereinbelow, during operation of the system, following initial pressurization thereof, the system is operated as a closed loop, with no additional product gas being introduced into activation gas inlet line 15 (or elsewhere) and with no gas being purged via the one or more purge lines 50 until the concentration of carbon monoxide in the circulation loop is below a desired CO concentration, the concentration of water vapor in the circulation loop is below a desired water vapor concentration, or both. That is, in embodiments, following initial pressurization, no makeup hydrogen is introduced into the system. The system may thus further comprise suitable apparatus, as known in the art, to measure the levels of CO and/or $H_2O$ in the circulating fluid. Such apparatus may be positioned anywhere throughout the closed loop of system 100/100A, for example, within circulation loop 30/30A, on activation gas inlet line 15 downstream of recycle introduction from line 45, or on gas outlet line 25 upstream circulation loop inlet line 35.

III. Method of Fischer-Tropsch Catalyst Activation

Also disclosed herein is a novel method of activating a Fischer-Tropsch catalyst. In embodiments, the method may comprise (a) introducing an activation gas into an activation reactor of an circulation loop until a desired activation pressure is attained, wherein the activation gas comprises product gas separated from a gas stream and comprising hydrogen and at least one non-inert (with respect to catalyst activation) component selected from the group consisting of carbon monoxide and water, wherein the activation reactor contains the Fischer-Tropsch catalyst to be activated, and wherein the circulation loop is configured for recycle to the activation reactor of hydrogen exiting therefrom; (b) circulating gas through the circulation loop and heating the activation reactor to a circulation temperature less than an activation temperature at which the Fischer-Tropsch catalyst is reduced, whereby at least a portion of any carbon monoxide is converted into an inert component with the production of water vapor, and wherein circulating gas through the circulation loop comprises removing at least a portion of the water vapor introduced with the product gas, at least a portion of the water vapor formed via conversion of the carbon monoxide, at least a portion of any $H_2O$ formed via reduction of catalyst from a higher oxide to a lower oxide, or some combination thereof; (c) maintaining circulation until the concentration of carbon monoxide in the circulation loop is below a desired CO concentration, the concentration of water vapor in the circulation loop is below a desired water vapor concentration, or both; and (d) raising the temperature of the activation reactor to the activation temperature. Each of the steps of the herein disclosed method is described in more detail hereinbelow.

Introducing Activation Gas into an Activation Reactor (a).

One or more of the herein disclosed methods of activating Fischer-Tropsch catalyst may comprise introducing an activation gas into an activation reactor of a circulation loop until a desired activation pressure is attained. The activation gas may comprise product gas separated from a gas stream and comprising hydrogen and at least one component selected from the group consisting of carbon monoxide and water vapor, the activation reactor may contain the Fischer-Tropsch catalyst to be activated, and the circulation loop may be configured for recycle to the activation reactor gas comprising hydrogen that exits therefrom. Via the recycle, following startup, the activation gas introduced into activation reactor 20 may comprise recycled hydrogen. The activation gas may comprise product gas separated from a gas stream and comprising hydrogen and at least one component ('non-inert' component or 'contaminant') selected from the group consisting of carbon monoxide and water vapor.

Producing Product Gas.

The method can further comprise producing the product gas. The product gas can be produced by introducing a gas stream comprising hydrogen into a hydrogen separator, as discussed hereinabove. In embodiments, the product hydrogen is produced via one or more a hydrogen separation membranes. The gas stream from which the product gas is produced can be selected from the group consisting of synthesis gas, unreacted Fischer Tropsch tail gas, pre-reformer gas, reformer gas, shifted gas, ammonia plant purge gas, demethanizer/ethylene off gases, POX gases, refinery purge streams and combinations thereof. In embodiments, the gas stream from which the product gas is produced comprises synthesis gas suitable for Fischer-Tropsch reactions, as previously discussed hereinabove.

Referring back to FIG. 1, product gas can be produced by introducing a gas comprising hydrogen into a separation apparatus 10 via line 5. Hydrogen separation apparatus 10 operates to produce product gas comprising primarily hydrogen, which exits hydrogen separation apparatus 10 via activation gas inlet line 15, which fluidly connects hydrogen separation apparatus 10 and activation reactor 20.

In embodiments, the product gas, and thus the activation gas, further comprises at least one component selected from the group consisting of $CO_2$, $CH_4$ and $N_2$. In embodiments, the product gas comprises less than 99.5 volume percent hydrogen. In embodiments, the product gas comprises less than 99 volume percent hydrogen. In embodiments, the product gas comprises at least 1 volume percent of one or more non-inert gases other than hydrogen. Such non-inert gas includes any gas which is not considered inert with regard to catalyst activation. Such non-inert gas includes carbon monoxide and water vapor, which tend to negatively influence catalyst activation if present above certain levels, which depend on the nature of the Fischer-Tropsch catalyst being activated. In embodiments, the product gas comprises at least 1 volume percent carbon monoxide.

As discussed in detail hereinabove, activation reactor 20 is either a dedicated activation reactor or a Fischer-Tropsch production reactor. In embodiments, activation reactor 20 is a Fischer-Tropsch synthesis reactor. In embodiments, activation reactor 20 is a dedicated activation reactor and the method may further comprise transferring the Fischer-Tropsch catalyst to a Fischer-Tropsch synthesis reactor following activation (d).

Activation reactor 20 contains the Fischer-Tropsch catalyst to be activated. As mentioned hereinabove, the Fischer-Tropsch catalyst activated via the disclosed method can be selected from any Fischer-Tropsch catalysts known in the art to be suitable for catalyzing Fischer-Tropsch synthesis reactions that are reduced prior to (or during) Fischer-Tropsch synthesis in order to achieve significant activity. As discussed hereinabove with regard to the system, the Fischer-Tropsch catalyst activated via this disclosure can be selected from the group consisting of cobalt-based Fischer-Tropsch catalysts, iron-based Fischer-Tropsch catalysts, ruthenium-based Fischer-Tropsch catalysts, nickel-based Fischer-Tropsch catalysts, manganese-based Fischer-Tropsch catalysts, and copper-based Fischer-Tropsch catalysts. In embodiments, the Fischer-Tropsch catalyst within activation reactor 20 is iron-based. In embodiments, the Fischer-Tropsch catalyst within activation reactor 20 is cobalt-based.

According to (a), activation gas is introduced into activation reactor 20 of circulation loop 30 until a desired activation pressure is attained. The desired activation pressure will depend on the Fischer-Tropsch catalyst to be activated. In embodiments, the Fischer-Tropsch catalyst is an iron-based Fischer-Tropsch catalyst and the activation pressure is in the range of from about 25 psig to about 400 psig, from about 50 psig to about 150 psig or from about 75 psig to about 110 psig. In embodiments, the catalyst to be activated via the disclosed method is an iron-based Fischer-Tropsch catalyst and the desired activation pressure is about 250, about 150 or about 100 psig.

In embodiments, the Fischer-Tropsch catalyst is a cobalt-based Fischer-Tropsch catalyst and the activation pressure is in the range of from about 25 psig to about 400 psig, from about 50 psig to about 150 psig or from about 75 psig to about 110 psig. In embodiments, the catalyst to be activated via the disclosed method is a cobalt-based Fischer-Tropsch catalyst and the desired activation pressure is about 150, about 100 or about 80 psig.

Circulation Gas Through Circulation Loop and Heating Activation Reactor to Circulation Temperature (b).

The disclosed method of activating Fischer-Tropsch catalyst comprises circulating gas through the circulation loop and heating the activation reactor to a circulation temperature less than an activation temperature at which the Fischer-Tropsch catalyst is reduced, whereby at least a portion of any carbon monoxide is converted into an inert component with the production of water vapor, and wherein circulating gas through the circulation loop comprises removing at least a portion of the $H_2O$ introduced with the product gas, at least a portion of any $H_2O$ formed via conversion of any carbon monoxide, at least a portion of any $H_2O$ formed via catalyst reduction from a higher oxide to a lower oxide (e.g., $Co_3O_4$ to $Co_2O_3$), or some combination thereof from circulation loop 30(30A)/system 100(100A).

In embodiments, following pressurization in (a), the system/circulation is operated as a closed system/closed loop, i.e. no further product gas is introduced into activation gas inlet line 15 and no gas is removed via the one or more purge lines 50 which may be present in embodiments of the system. In embodiments, following initial pressurization, no makeup hydrogen is introduced into the system. Circulation loop 30 is configured for recycle to activation reactor 20 of gas comprising hydrogen which exits therefrom via gas outlet line 25. The gas is circulated throughout circulation loop 30 and activation reactor 20 is heated. Upon heating, oxides in the catalyst may be reduced, releasing oxygen, which reacts with hydrogen in the activation gas, resulting in the formation of $H_2O$. Additionally, when the activation gas comprises carbon monoxide, at least a portion of any carbon monoxide present in the system following pressurization reacts with hydrogen in the activation gas, thus being converted to an inert component(s), for example, methane, again with the production of $H_2O$. The conversion of carbon monoxide to inert will occur at a temperature below the activation temperature of the catalyst (i.e. below the temperature at which the oxides of the catalyst are completely reduced to carbide(s)). In embodiments, the catalyst is selected from the group consisting of cobalt-based Fischer-Tropsch catalysts and the reactor temperature of (b) is less than or equal to about 400° C., 350° C. or 315° C. In embodiments, the catalyst is selected from the group consisting of iron-based Fischer-Tropsch catalysts and the circulation temperature of (b) is less than or equal to about 450° C., 400° C. or 350° C.

As illustrated in FIG. 1, during circulation of the gas throughout circulation loop 30, the gas exiting activation reactor 20 passes through one or more water removal apparatus 40, from which $H_2O$ is removed, for example, via $H_2O$ outlet line 43. In this manner, at least a portion of the water vapor introduced into system 100 with the product/activation gas during pressurization, at least a portion of the $H_2O$ formed via conversion of any carbon monoxide present, at least a portion of any $H_2O$ formed via catalyst reduction from a higher oxide to a lower oxide (e.g., $Co_3O_4$ to $Co_2O_3$), or some combination thereof is removed from circulation loop 30/system 100.

Treating the gas comprising unreacted hydrogen that exits activation reactor 20 to lower its dew point includes removing water from the gas, to maintain the water partial pressure at a low level and thus promote catalyst activity. Removing water from the activation reactor exit gas may include cooling the exit gas to condense at least some of the water and removing the aqueous condensate. Removing water from the exit gas may alternatively or additionally include contacting the exit gas comprising unreacted hydrogen with a dessicant (i.e. a water absorbent or adsorbent). Suitable water absorbents and adsorbents are well-known to those skilled in the art.

In embodiments, removing at least a portion of the $H_2O$ comprises reducing the temperature of the gas exiting the activation reactor and separating water therefrom. In embodiments, reducing the temperature of the gas exiting activation reactor 20 and separating water therefrom comprises introducing the exit gas into a cooler and introducing the cooled gas into a gas/liquid separator, whereby water is separated from a vapor fraction. For example, in the embodiment of FIG. 2, gas exiting activation reactor 20 via gas outlet line 25 is introduced via line 35 into heat exchanger or cooler 40A. As discussed hereinabove, cooler 40A operates to reduce the temperature of the material introduced therein. For example, cooler 40A may operate via introduction of chilled coolant via line 46 and removal of heated coolant via line 47. In embodiments, the cooled product exiting cooler 40A (which comprises gas and entrained $H_2O$ vapor/droplets) has a temperature of less than or about 4° C.

In embodiments, the cooled product exiting cooler 40A (which comprises gas and entrained $H_2O$ vapor/droplets) has a temperature of less than or about 2° C. In embodiments, the cooled product exiting cooler 40A (which comprises gas and entrained $H_2O$ vapor/droplets) has a temperature of less than or about 0° C. The cooled material exits cooler 40A and is introduced into gas/liquid separator 40B via line 55. As discussed hereinabove, gas/liquid separator 40B is configured to separate $H_2O$ from the cooled product introduced thereto. Removed water is extracted from gas/liquid separator 40B via water removal line 43A. Reduced dew point gas exits gas/liquid separator 40B via line 65. In embodiments, such a cooler/gas/liquid separator combination is the only water removal apparatus utilized in the method. In other embodiments, such a cooler/gas/liquid separator combination is utilized as a first water removal apparatus upstream of at least one other water removal apparatus. In embodiments, such a cooler/gas/liquid separator is utilized as a second water removal apparatus downstream of at least one other water removal apparatus.

In embodiments, removing at least a portion of the $H_2O$ comprises introducing the gas exiting the activation reactor into one or more dryers. As discussed hereinabove, in embodiments, the one or more dryers are selected from the group consisting of liquid absorbers and molecular sieves. In embodiments, such a dryer is utilized as an only water removal apparatus. In embodiments, such a dryer is utilized as a second water removal apparatus downstream of at least one other water removal apparatus. In embodiments, the one or more dryers comprise a molecular sieve capable of dew points less than or in the range of from about −20° F. to about −30° F. In embodiments, the one or more dryers comprise a molecular sieve operable to reduce the water content of a material introduced thereto to less than 100 ppmv at 1 atmosphere (i.e. to a dew point of less than about −20° C.). In embodiments, the one or more dryers comprise a molecular sieve operable to reduce the water content of a material introduced thereto to less than 1 ppmv at 1 atmosphere (i.e. to a dew point of less than about −105° F.). In embodiments, the one or more dryers comprise a liquid absorber.

In embodiments, the gas exiting a first water removal apparatus (e.g., cooler 40A and gas/liquid separator 40B) has an undesirably high dew point, and a second apparatus is utilized to further reduce the $H_2O$ content (i.e. the dew point) thereof. Thus, in embodiments, reducing the temperature of the gas exiting activation reactor 20 and separating water therefrom further comprises introducing the gas/vapor fraction exiting a first water removal device (e.g., the combination of cooler 40A and gas/liquid separator 40B) into a second water removal device (e.g., a dryer 40C). For example, in the embodiment of FIG. 2, system 100A further comprises dryer 40C configured to further reduce the dew point of the material circulated therethrough. In embodiments, the method further comprises compressing the circulating gas. For example, in embodiments, the method further comprises compressing a reduced $H_2O$ fraction exiting a first water removal apparatus prior to introduction thereof into a second water removal apparatus.

In embodiments, the first or second water removal apparatus comprises a molecular sieve. The molecular sieve may be operable to reduce the dew point to a value of less than or in the range of from about −20° F. to about −30° F. In embodiments, the circulation loop comprises a molecular sieve operable to reduce the water content to less than 100 ppmv at 1 atmosphere (a dew point of less than about −20° C.). In embodiments, the circulation loop comprises a molecular sieve operable to reduce the water content to less than 1 ppmv at 1 atmosphere (a dew point of less than about −105° F.)

Maintaining Circulation Until Desired CO and/or $H_2O$ Concentration(s) Obtained (c).

The disclosed method further comprises maintaining methanation conditions, i.e. the circulation at (b) whereby at least a portion of any carbon monoxide present is converted to an inert component (i.e. methane, which is inert with respect to catalyst activation), until the concentration of CO in the circulation loop is below a desired CO concentration, the concentration of $H_2O$ in the circulation loop is below a desired $H_2O$ concentration, or both. In embodiments, the catalyst being activated via the disclosed method is a cobalt-based Fischer-Tropsch catalyst and the desired CO concentration is less than about 10 ppmv. In embodiments, the catalyst being activated via the disclosed method is a cobalt-based Fischer-Tropsch catalyst and the desired CO concentration is less than about 1 ppmv. In embodiments, the catalyst being activated via the disclosed method is a cobalt-based Fischer-Tropsch catalyst and the desired CO concentration is less than about 0.1 ppmv. In embodiments, the catalyst being activated via the disclosed method is a cobalt-based Fischer-Tropsch catalyst and the desired $H_2O$ concentration is less than about 100 ppmv. In embodiments, the catalyst being activated via the disclosed method is an iron-based Fischer-Tropsch catalyst and the desired CO concentration is less than about 10 ppmv. In embodiments, the catalyst being activated via the disclosed method is an iron-based Fischer-Tropsch catalyst and the desired CO concentration is less than about 1 ppmv. In embodiments, the catalyst being activated via the disclosed method is an iron-based Fischer-Tropsch catalyst and the desired CO concentration is less than about 0.1 ppmv. In embodiments, the catalyst being activated via the disclosed method is an iron-based Fischer-Tropsch catalyst and the desired $H_2O$ concentration is less than about 100 ppmv.

Raising the Temperature of the Activation Reactor to Activation Temperature (d).

The disclosed method of activating Fischer-Tropsch catalyst further comprises completing catalyst activation according to standard protocol for the selected Fischer-Tropsch catalyst being activated. Desirably, catalyst activation is performed to impart maximal activity to the catalyst with minimal sintering of the catalyst. During (d), circulation throughout circulation loop 30/30A is maintained and heating up is continued according to the catalyst reduction protocol (i.e. temperature requirements and desired holding periods). Thus, (d) comprises raising the temperature of the activation reactor 20 to the activation temperature at which the catalyst is substantially completely reduced (d). Once the desired concentration(s) of CO and/or $H_2O$ are attained, the temperature is increased. Such temperature increase may be effected, for example, by heating activation reactor 20. As known in the art, completing catalyst activation can comprise serially raising the temperature to one or more temperatures and optionally holding at one or more of the one or more temperatures for desired time periods. Also as known in the art, each temperature raise of the activation protocol may be performed at a specified ramp rate (e.g., about 0.15, 1, 2 or 3 degrees Celsius per minute). Use of such controlled temperature ramp rates may serve to prevent the extremely exothermic reduction process from causing sintering of catalyst metals.

For example, raising the temperature may require raising to a first elevated temperature at a first ramp rate, holding at the first elevated temperature for a first holding time, raising to a second elevated temperature (above the first elevated temperature) at a second ramp rate, holding at the second elevated temperature for a second holding time, or some combination thereof. In embodiments, activation comprises slowly ramping the temperature at a first ramp rate (e.g., about 1° C./min) to a first temperature (e.g., about 100° C.), holding for a first time period (e.g., two hours) to dry the sample, ramping at a second ramp rate (e.g., about 1° C./min) to a second temperature (e.g., 350° C.) and holding for a second time period (e.g., three hours).

Following activation at (d), the activated catalyst may be cooled down as known in the art, allowing the pressure to drop with the cooling of the system. The process may include, after having activated the Fischer-Tropsch synthesis catalyst to produce freshly activated Fischer Tropsch catalyst, cooling the freshly activated Fischer-Tropsch catalyst in a first gas (e.g., the circulating hydrogen) to a temperature $T_c$ and thereafter further cooling the activated Fischer-Tropsch catalyst down to room temperature in substantially another gas (e.g., in an inert gas, such as substantially pure nitrogen). If using nitrogen, temperature $T_c$ must be low enough to ensure that nitrogen behaves as an inert during the final cooling phase.

In embodiments, the catalyst being activated via the disclosed method is a cobalt-based catalyst and the temperature is increased at (d) to an activation temperature in the range of from about 250° C. to about 450° C. In embodiments, the catalyst being activated via the disclosed method is a cobalt-based catalyst and the temperature is increased at (d) to an activation temperature in the range of from about 300° C. to about 400° C. In embodiments, the catalyst being activated via the disclosed method is a cobalt-based catalyst and the temperature is increased at (d) to an activation temperature in the range of from about 310° C. to about 350° C. In embodiments, the catalyst being activated via the disclosed method is a cobalt-based catalyst and the temperature is increased at (d) to an activation temperature of about 315° C., 350° C. or 400° C. In embodiments, the catalyst being activated via the disclosed method is a cobalt-based catalyst and the pressure during activation at (d) is in the range of from about 2 atm to about 30 atm, from about 5 atm to about 25 atm or from about 5 atm to about 15 atm. In embodiments, the catalyst being activated via the disclosed method is a cobalt-based catalyst and the pressure during activation at (d) is about 5 atm, about 10 atm, or about 15 atm. In embodiments, the catalyst being activated via the disclosed method is a cobalt-based catalyst and reduction conditions are maintained for a time period in the range of from about 2 to about 24 hours or a time period of at least about 8, 16 or 24 hours. In embodiments, the catalyst being activated via the disclosed method is a cobalt-based catalyst and the gas linear velocity that should be maintained is between 10 to 40 cm/s.

In embodiments, the catalyst being activated via the disclosed method is an iron-based catalyst and the temperature is increased at (d) to an activation temperature in the range of from about 200° C. to about 450° C. In embodiments, the catalyst being activated via the disclosed method is an iron-based catalyst and the temperature is increased at (d) to an activation temperature in the range of from about 250° C. to about 400° C. In embodiments, the catalyst being activated via the disclosed method is an iron-based catalyst and the temperature is increased at (d) to an activation temperature in the range of from about 320° C. to about 400° C. In embodiments, the catalyst being activated via the disclosed method is an iron-based catalyst and the temperature is increased at (d) to an activation temperature of about 250° C., 310° C. or 370° C. In embodiments, the catalyst being activated via the disclosed method is an iron-based catalyst and the pressure during activation at (d) is in the range of from about 50 psig to about 400 psig, from about 80 psig to about 300 psig or from about 90 psig to about 150 psig. In embodiments, the catalyst being activated via the disclosed method is an iron-based catalyst and the pressure during activation at (d) is about 100 psig, about 125 psig, or about 140 psig. In embodiments, the catalyst being activated via the disclosed method is an iron-based catalyst and reduction conditions are maintained for a time period in the range of from about 2 to about 72 hours, or for at least 2, 8 or 16 hours. In embodiments, the catalyst being activated via the disclosed method is an iron-based catalyst and the gas linear velocity that should be maintained is between 10 to 40 cm/s.

As circulating hydrogen is consumed and water is removed (e.g., condensed and drained and/or absorbed by a molecular sieve or liquid absorbent), the pressure within system 100 will decrease. In embodiments, prior to raising the temperature of the activation reactor to the activation temperature at (d), the pressure falls less than about 20 psig, less than about 15 psig, less than about 10 psig, or less than about 5 psig from the desired activation pressure. At the end of (c), the gas composition within circulation loop 30/30A will vary depending on the relative amount of hydrogen introduced into system 100/100A and the amount of metal (e.g., cobalt or iron) reduced. By way of non-limiting example, if only 3 volume percent of the total inventory of hydrogen introduced into system 100/100A is consumed, the hydrogen concentration may drop from, for example, 95 volume percent to about 94.8 volume percent. If about 15 volume percent of the total hydrogen inventory is consumed, the hydrogen concentration may drop to about 94.1 volume percent. Desirably, the disclosed catalyst activation method enables removal of at least one non-inert component (e.g., carbon monoxide and/or $H_2O$) from the activation gas without a substantial drop in hydrogen purity. In embodiments, the hydrogen consumption is limited to single digits. In embodiments, prior to raising the temperature of the activation reactor to the activation temperature at (d), the hydrogen purity of the activation gas in circulation loop 30/30A is no more than about 10, 9, 8, 7, 6, 5, 4, 3, 2 or 1 volume percent less than the hydrogen purity of the product or activation gas introduced during (a).

Purging a Portion of Circulating Gas.

In embodiments, the method further comprises purging a portion of the gas from the circulation loop. In embodiments, such purging is not performed prior to (b). In embodiments, such purging is not performed prior to (c). In embodiments, such purging is not performed prior to (d). In embodiments, activation reactor 20 is not purged until after desired activation pressure is attained at (a). Purging may be utilized to reduce the buildup of an undesirable in the system (such as, by way of non-limiting example, methane) and/or to control the pressure within the system. In such embodiments, the gas exiting activation reactor 20 via gas outlet line 25 is split into a purge stream that exits system 100 via purge line 50 and a circulation stream that is introduced/returned to circulation loop 30 via line 35.

IV. Method of Producing Fischer-Tropsch Hydrocarbons

Also disclosed herein is a method of producing Fischer-Tropsch hydrocarbons. The method of producing Fischer-Tropsch hydrocarbons comprises activating a Fischer-Tropsch catalyst according to the disclosed activation process and contacting the thus activated catalyst with synthesis gas under conditions operable to produce Fischer-Tropsch hydrocarbons. In embodiments, the method of producing Fischer-Tropsch hydrocarbons comprises introducing a synthesis feed gas comprising carbon monoxide and hydrogen into a Fischer-Tropsch synthesis reactor containing a Fischer-Tropsch catalyst activated according to this disclosure. In the Fischer-Tropsch synthesis reactor, the feed gas is catalytically converted to a product stream comprising liquid Fischer-Tropsch hydrocarbons. The Fischer-Tropsch synthesis reactor is operated at temperatures and pressures to obtain a desired product stream. Preferred products contain hydrocarbon species having 5 or more carbon atoms (C5+). In embodiments, the Fischer-Tropsch synthesis reactor is operated at a pressure in the range of from about 100 psig to about 1200 psig, from about 200 to about 800 psig or from about 250 to about 550 psig. In embodiments, the Fischer-Tropsch synthesis reactor is operated at a temperature in the range of from about 175° C. to 350° C., from about 200° C. to 350° C., from about 180° C. to about 240° C., or at a temperature of less than about 300° C.

The Fischer-Tropsch synthesis can be carried out over a wide range of space velocities. In embodiments, the Fischer-Tropsch synthesis is carried out at gas linear velocity between 10 to 40 cm/s.

The feed stream gas for the Fischer-Tropsch synthesis reactor comprises a mixture of hydrogen and carbon monoxide, (i.e. synthesis gas or 'syngas'). Synthesis gas suitable as a feedstock for conversion to hydrocarbons can be obtained from various sources, for example, from light hydrocarbons, including methane or other hydrocarbons in natural gas, by means of various reforming processes, including steam reforming, auto-thermal reforming, dry reforming, advanced gas heated reforming, and by partial oxidation (e.g., catalytic partial oxidation). Other processes known in the art can be employed to generate suitable feed gas streams for the Fischer-Tropsch synthesis. In embodiments, the synthesis gas for activation and/or Fischer-Tropsch synthesis is obtained from the gasification of biomass and/or coal. The synthesis gas may also comprise off-gas recycled from a Fischer-Tropsch synthesis reactor, as known in the art.

In embodiments, the molar ratio of hydrogen to carbon monoxide in the Fischer-Tropsch synthesis reactor feed is greater than about 0.5:1. In embodiments, the molar ratio of hydrogen to carbon monoxide in the Fischer-Tropsch synthesis reactor feed is in the range of from about 0.67 to about 2.5. In embodiments, the molar ratio of hydrogen to carbon monoxide in the Fischer-Tropsch synthesis reactor feed is in the range of from about 1.4:1 to about 2.3:1.

In embodiments, the Fischer-Tropsch catalyst is cobalt-based and the synthesis gas with which the activated catalyst is contacted during Fischer-Tropsch synthesis comprises a molar ratio of $H_2$:CO in the range of from about 0.8 to about 3.0, from about 1.0 to about 2.5 or from about 1.3 to about 1.9.

In embodiments, the Fischer-Tropsch catalyst is iron-based and the synthesis gas with which the activated catalyst is contacted during Fischer-Tropsch synthesis comprises a molar ratio of $H_2$:CO in the range of from about 0.5 to about 3.2, from about 0.7 to about 2.5 or from about 1.0 to about 1.8.

The Fischer-Tropsch synthesis can be carried out in any known reactor type as described in more detail hereinabove. In embodiments, Fischer-Tropsch catalyst activated according to this disclosure is employed in a slurry bed reactor. In embodiments, Fischer-Tropsch catalyst activated according to this disclosure is employed in a fixed bed reactor. In embodiments, Fischer-Tropsch catalyst activated according to this disclosure is employed in a microchannel reactor.

Thus, following activation, the Fischer-Tropsch catalyst may be utilized to form Fischer-Tropsch hydrocarbons. In embodiment in which activation reactor 20 is a Fischer-Tropsch synthesis reactor, utilizing the activated catalyst to produce Fischer-Tropsch hydrocarbons may simply comprise aligning the reactor to begin Fischer Tropsch synthesis and/or introducing synthesis gas into the reactor. In embodiments in which activation reactor 20 is a dedicated activation reactor, utilizing the activated catalyst to produce Fischer-Tropsch hydrocarbons may comprise transferring the activated catalyst to a Fischer-Tropsch synthesis reactor and introducing synthesis gas into the Fischer-Tropsch synthesis reactor. As discussed hereinabove, such transfer may desirably be made via catalyst coating and/or under inert atmosphere to minimize/prevent re-oxidation of catalyst and concomitant loss of activity.

As known in the art, hydrocarbons in the Fischer-Tropsch product stream can be characterized by the number of carbon atoms present, and can be grouped into fractions based on a common carbon number. A well-established statistical treatment (i.e. the Anderson-Shultz Flory method) originally developed for polymerization reactions based on a step-wise chain growth mechanism has been applied for product analysis in Fischer-Tropsch synthesis. In this treatment chain growth probability is plotted as a function of chain length in a so-called Anderson-Shultz-Flory plot. The slope of this plot is the Anderson-Shultz-Flory value 'alpha' or more simply, the alpha value, $\alpha$, or the growth factor. This statistical treatment can be used to characterize the distribution of hydrocarbons obtained from Fischer-Tropsch synthesis, and the alpha value is defined as the probability of chain growth step to the next higher carbon number divided by the sum of the growth step probability plus the chain termination probability. The alpha value can be used to estimate the distribution of carbon number products and thereby the effectiveness of the process to furnish a product stream having a particular carbon number distribution. The alpha value generally depends on the catalyst and the operating conditions (temperature and pressure) and the relative concentrations of feed gas components (e.g., CO, hydrogen, $CO_2$, etc.). It is generally known in the art that Fischer-Tropsch reaction conditions can be adjusted to vary the product profile.

In embodiments, the disclosed method of Fischer-Tropsch synthesis provides a hydrocarbon product in which the majority of hydrocarbons comprise more than 5 carbon atoms (i.e. 'C5+' hydrocarbons). In embodiments, the disclosed method of Fischer-Tropsch synthesis provides a Fischer-Tropsch product having an average alpha greater than about than 0.65 or 0.75. Fischer-Tropsch synthesis involves the catalytic reductive oligomerization of carbon monoxide in the presence of hydrogen to form paraffinic and olefinic hydrocarbons. Generally, the process converts a mixture of carbon monoxide and molecular hydrogen into a mixture of hydrocarbons, including saturated hydrocarbons and olefins. The Fischer-Tropsch synthesis product comprises a mixture of hydrocarbon products having a range of molecule weights and including, at Fischer-Tropsch synthesis reaction conditions, gaseous and liquid hydrocarbons. The product stream when assessed at ambient temperature and pressure can contain gases, liquids and waxy hydrocarbons. The product stream may contain linear and branched hydrocarbons. The nature of the product stream generally depends upon the reaction conditions (e.g., temperature) and the catalyst employed. When the reaction is conducted at lower temperatures the product stream generally contains a majority of linear hydrocarbons.

The hydrocarbons produced in a Fischer-Tropsch synthesis process as described hereinabove may be upgraded to more valuable products by subjecting all or a portion of the C5+ hydrocarbons to fractionation and/or conversion operations. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like. Such conversion operations may comprise one or more operations in which the molecular structure of at least a portion of the hydrocarbon is changed. Thus, such conversions include both non-catalytic processing, e.g., steam cracking, and catalytic processing, e.g., catalytic cracking, in which the portion, or fraction, is contacted with a suitable catalyst. If hydrogen is present as a reactant, such process steps are typically referred to as hydro-conversion and variously as hydro-isomerization, hydro-cracking, hydro-dewaxing, hydro-refining and the like. More rigorous hydro-refining is typically referred to as hydro-treating. These reactions are conducted under conditions well documented in the literature for the hydro-conversion of hydrocarbon feeds, including hydrocarbon feeds rich in paraffins. Thus, a Fischer-Tropsch synthesis method of this disclosure may further comprise upgrading the Fischer-Tropsch synthesis product or a fraction thereof via one or more fractionation and/or conversion operations.

V. Activated Fischer-Tropsch Catalyst

Also disclosed herein is an activated Fischer-Tropsch catalyst, when obtained by the system and/or process of this disclosure.

VI. Advantages/Benefits

The disclosed system and method enable the activation of Fischer-Tropsch catalyst with an activation gas, comprising primarily hydrogen, that is produced without the need for expensive pressure swing adsorption unit(s). Generally, the choice between a PSA system and a membrane system depends on the purity requirement. If ultra-pure hydrogen (e.g., greater than about 99.5 volume percent hydrogen) is not needed for catalyst reduction, as enabled via the disclosed system and method, capital costs can be reduced. For a similar capacity, a PSA unit can cost more than twice the cost of a membrane system.

Whenever a range is given in this specification, for example, a temperature range, a time range, a composition range, or a concentration range, the range given is intended to be inclusive of the endpoints given, and all intermediate ranges and sub-ranges, and all individual values included in the ranges given are intended to be included in the disclosure.

As used herein, 'comprising' is synonymous with 'including,' 'containing,' or 'characterized by,' and is inclusive or open-ended and does not exclude additional, unrecited elements or method steps. As used herein, 'consisting of' excludes any element, step, or ingredient not specified in the claim element. As used herein, the phrase 'consisting essentially of' does not exclude materials or steps that do not materially affect the basic and novel characteristics of the claim. In each instance herein any of the terms 'comprising', 'consisting essentially of' and 'consisting of' may be replaced with either of the other two terms. The invention illustratively described herein suitably may be practiced in the absence of any element or elements, limitation or limitations which are not specifically disclosed herein.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein and to the extent that there is no inconsistency with this disclosure.

What is claimed is:

1. A system for activating a Fischer-Tropsch catalyst, the system comprising:
    a separation apparatus configured for separating a product gas comprising primarily hydrogen from a gas stream comprising hydrogen and at least one component selected from the group consisting of carbon monoxide and water vapor;
    an activation reactor fluidly connected with the separation apparatus via an activation gas inlet line whereby the product gas may be introduced into the activation reactor;
    a circulation loop fluidly connecting a gas outlet of the activation reactor with the activation gas inlet line or with another gas inlet of the activation reactor and fluidly connecting the activation reactor with one or more apparatus configured for removal of $H_2O$;
    a measurement device to measure the concentration of the at least one component of carbon monoxide or water vapor in the circulation loop; and
        wherein, after initial pressurization, the circulation loop is configured to maintain the circulation as a closed loop system until the measured concentration of the at least one component, as measured by the measurement device, is below a desired concentration of either for carbon monoxide in a range of less than about 10 ppmv to less than about 0.1 ppmv or for water vapor a water concentration of less than about 100 ppmv and the circulation loop is configured to become open after the measured concentration of the at least one component is below the desired concentration.

2. The system of claim 1, wherein the product gas comprises less than about 99.5 volume percent hydrogen.

3. The system of claim 1, wherein the separation apparatus is configured to provide a product gas comprising less than about 99 volume percent hydrogen.

4. The system of claim 1, wherein the activation reactor is a Fischer-Tropsch synthesis reactor or a dedicated activation reactor.

5. The system of claim 1, wherein the one or more apparatus comprises a cooler and a gas/liquid separator, wherein the cooler is configured to cool a gas introduced therein via the circulation loop such that water condenses and wherein the gas/liquid separator is configured for removal of condensed water from a vapor fraction comprising hydrogen.

6. The system of claim 5, wherein the cooler is configured to cool a gas introduced therein via the circulation loop to a temperature of less than about 4° C.

7. The system of claim 5, further comprising at least one dryer located downstream of the gas/liquid separator along the circulation loop.

8. The system of claim 7, further comprising a blower or compressor between the gas/liquid separator and the at least one dryer and configured to compress the vapor fraction comprising hydrogen prior to introduction thereof into the at least one dryer.

9. The system of claim 8, wherein the dryer is selected from the group consisting of liquid absorbers and molecular sieves.

10. The system of claim 9, comprising at least one molecular sieve capable of drying the gas within the dryer to dew points of less than or in the range of from about $-20°$ F. to $-30°$ F.

11. The system of claim 10, wherein the molecular sieve is operable to reduce the water content of the gas within the dryer to less than 100 ppmv at 1 atmosphere.

12. The system of claim 1, wherein the one or more apparatus comprises a dryer.

13. The system of claim 12, further comprising a blower or compressor positioned upstream of the dryer along the circulation loop and configured to compress materials introduced thereto via the circulation loop.

14. The system of claim 12, wherein the dryer is selected from the group consisting of liquid absorbers and molecular sieves.

15. The system of claim 14, comprising at least one molecular sieve capable of drying the gas within the dryer to dew points of less than or in the range of from about $-20°$ F. to $-30°$ F.

16. The system of claim 15, wherein the molecular sieve is operable to reduce the water content of the gas within the dryer to less than 100 ppmv at 1 atmosphere.

17. The system of claim 16, wherein the molecular sieve is operable to reduce the water content of the gas within the dryer to less than 1 ppmv at 1 atmosphere.

18. The system of claim 1, further comprising a purge line configured for removal of gas from the circulation loop.

* * * * *